United States Patent [19]

Ciacci et al.

[11] Patent Number: 4,665,483
[45] Date of Patent: May 12, 1987

[54] DATA PROCESSING SYSTEM ARCHITECTURE

[75] Inventors: Franco Ciacci, Magenta; Vincenzo Pizzoferrato, Cornaredo; Giancarlo Tessera, Milan, all of Italy

[73] Assignee: Honeywell Information Systems Italia, Milan, Italy

[21] Appl. No.: 659,371

[22] Filed: Oct. 10, 1984

[30] Foreign Application Priority Data

Oct. 25, 1983 [IT] Italy .................. 23410 A/83

[51] Int. Cl.$^4$ .................. G06F 13/14; G06F 13/40
[52] U.S. Cl. .................. 364/200
[58] Field of Search ... 364/200 MS File, 900 MS File

[56] References Cited

U.S. PATENT DOCUMENTS

| | | | |
|---|---|---|---|
| 3,710,324 | 1/1973 | Cohen et al. | 364/200 |
| 3,993,981 | 11/1976 | Cassarino, Jr. et al. | 364/200 |
| 4,249,253 | 2/1981 | Gentili et al. | 371/38 |
| 4,303,808 | 12/1981 | Oswald | 179/175.3 F |
| 4,415,972 | 11/1983 | Adcock | 364/200 |
| 4,495,567 | 1/1985 | Treen | 364/200 |
| 4,509,140 | 4/1985 | Cheung | 364/900 |
| 4,559,595 | 12/1985 | Boudreau et al. | 364/200 |
| 4,587,609 | 5/1986 | Boudreau et al. | 364/200 |

FOREIGN PATENT DOCUMENTS 1379319 10/1964 France .

Primary Examiner—Archie E. Williams
Assistant Examiner—Thomas C. Lee
Attorney, Agent, or Firm—George Grayson; John S. Solakian; William A. Linnell

[57] ABSTRACT

Data processing system architecture in which a central processing unit (CPU) and a plurality of input/output processors (I/OP), said I/OPs being connected in parallel through a bus can have access to a common working memory, under control of a memory access control unit, through a set of tridirectional gates directly connecting memory to the CPU or to the bus without interposition of registers, drivers, receivers, except said tridirectional gates, between the internal CPU channel and the memory channel. The control unit periodically monitors, in synchronism with internal CPU cycles if memory access requests from the I/OP are pending and, absent such requests, the CPU may activate memory cycles in synchronism with its internal cycles without preamble diagloue and access waiting time. If I/OP memory access requests are pending, the control unit grants access to the I/OP on a priority basis, activates a memory cycle and monitors in time relation with the memory cycle if other I/OP memory access requests are pending, further granting memory access without delay at the end of the memory cycle. Absent further I/O memory access requests, the control unit resynchronizes its memory access request monitoring with the CPU internal cycles.

4 Claims, 8 Drawing Figures

DATA PROCESSING SYSTEM ARCHITECTURE

BACKGROUND OF THE INVENTION

1. Field of the Invention

The present invention relates to a data processing system architecture.

2. Description of the Prior Art

It is known to use a so-called bus architecture in data processing systems, where one or more central processors (in multiprocessor systems), a plurality of peripheral controllers and one or more working memories communicate with each other through a common channel or bus to transfer information between such units. The bus architecture, while involving some limitations, is largely used because it allows a wide flexibility in configuring the system to meet user requirements and reduces the number of connection leads among the units. Data processing systems having bus architecture are described in U.S. Pat. Nos. 3,710,324; 4,303,808; and 3,993,981. Bus architecture limitations are mainly caused by three factors:

(1) conflict in the use of the bus by the several units;
(2) synchronization in the operation of the several units; and
(3) electrical propagation of the signals.

CONFLICT IN USE

In a bus architecture means must be provided to assure the orderly transfer of information on the bus and to solve conflicts and interferences which may arise during the use of the bus. In the generally adopted solutions, a privileged unit or "master", which can be the central processor, controls the access to the bus in order to resolve conflicts. To this purpose, a pre-established priority is assigned to each unit. Further, each unit which wants to have access to the bus sends an access request to the master before loading the bus with electrical signals representative of information. The master periodically determines if bus access requests are present and in the case of several contemporaneous requests it grants the bus to the highest priority requesting unit. In other words, the effective use of the bus is preceded by a signal exchange on suitable leads, or preamble dialogue, which requires a certain time interval and reduces the information transfer speed or "transfer rate" of the bus. Generally, this limitation is overcome by a temporal overlapping of the preamble dialogue with the actual information transfer on the bus. This is generally possible in the case of bus access requests from peripheral controllers. On the contrary, central processors cannot systematically take advantage of this scheme. In fact, the central processor's subsequent behavior, and therefore a subsequent bus access request, is often conditioned by the actual transfer (sending or reception) of previous information on the bus. Therefore, such transfer operations must be completed. In U.S. Pat. No. 3,710,324, this specific limitation is overcome by designating a central processor as master. In this case, if the bus is available and if no priority access requests are present, at least the central processor acting as master can directly have access to the bus without any preliminary dialogue.

UNIT SYNCHRONIZATION

The operation of the several interconnected units on the bus is asynchronous. In other words, each unit operates according to its own machine cycle, independently of the other units. When a unit wants access to the bus, its request is considered and the bus access is granted at instants independent of its timing, but according to the master timing. It is therefore necessary that the requesting unit stops its operations while awaiting for its grant of the bus. Alternatively, bus interface registers must be supplied to temporarily store the information to be transferred (received or sent) on the bus while, in some cases, the unit can go on to execute other operations. In both cases, a synchronization with the master is required. In addition, the information transfer involves two units, and therefore, a further synchronization with the unit to which the information is to be sent is required.

Such synchronization occurs with a second preamble dialogue, which confirms the availability of the receiving unit for the information transfer, or with a subsequent confirmation of the completed transfer. In any case, such confirmation lengthens the transfer duration because it cannot overlap other phases of the process. Generally, such inconvenience is overcome by limiting the information exchange on the bus to the information exchange between any of the units and the memory. In this case, the working memory can act as master for the bus access control and the master's synchronization for the bus access concides with the working memory synchronization.

In this case, described in U.S. Pat. No. 4,303,808, the confirmation phase is not required because it is implicit in the preamble dialogue. It is, however, obvious that the choice of the working memory as master is incompatible with the choice of a central processor as master.

SIGNAL PROPAGATION

The bus is a communication channel consisting of a plurality of electrical leads connecting several units to one another. Such leads have a considerable length and irregular impedance characteristics owing to several connections (through connectors) to the several units arranged along the lead length. Therefore, the bus often undergoes electrical "noise" and signal reflections. Therefore, the signal transfer to the bus must be generally controlled through driving gates or "drivers" arranged at the interface of each unit. Further, each unit must be provided with suitable receiving gates. Obviously, the drivers must be of the tristate type so that their output impedance is virtually infinite when the corresponding unit has no signals to transfer to the bus.

The drivers and receivers have a typical signal propagation delay of about 20 to 40 nsec., which considerably increases the duration of the bus communication process. Typically, a bus information transfer (for instance the addressing of a working memory by a unit and the reading out of information from memory) requires about 600 to 800 nsec. It is clear that the presence of drivers and receivers on the information path increases such time by 40 to 80 nsec., which is about 10% of the total transfer time. The situation further deteriorates when, owing to synchronization requirements, latching registers are arranged in the intercommunicating units, or in one of them on the information path.

Conceptually, each system unit is organized around its own internal channel which receives information from logical arithmetic circuits, or memory circuits, and selectively transfers such information to such circuits for further processing. The internal processing cycle is very short (about 300 to 500 nsec.) when the information to be processed is already in the unit. However, if the information to be processed is to be sent to or received from the exterior, registers and gates for the connection with the outside (for instance, with the system bus) are required. This involves substantial delays between the instant when the information is available on the internal bus and the instant when the information is available on the external bus.

In conclusion, the configuration flexibility and the savings connected with the number of units obtained with a bus architecture are to the detriment of the operation time, which is substantially increased.

OBJECTS OF THE INVENTION

Accordingly, it is an object of the present invention to provide a bus architecture which allows the central processor to access working memory with a minimum of delay.

It is a further object of the present invention to provide a bus architecture which also reduces the delay of peripheral controllers when accessing working memory.

This invention is pointed out with particularity in the appended claims. An understanding of the above and further objects and advantages of this invention can be obtained by referring to the following description taken in conjunction with the drawings.

SUMMARY OF THE INVENTION

The present invention provides a bus architecture which partially eliminates such inconveniences and assures a high central processor operation speed when it has to process information received from the working memory. At the same time, the system architecture of the invention allows the overlapping of the preamble dialogue with the information exchange between controllers and working memory. These advantages are obtained with a bus architecture whose peripheral controllers communicate with a working memory through a bus, while a central processor communicates with the working memory through a separate channel.

The bus access control is essentially assigned to the central processor which synchronizes the bus access with its own internal cycle. In this way, no bus and memory access requests are sent by the peripheral controllers, the central processor can directly access the working memory without any preliminary dialogue and therefore without delays in the information transfer process. When the central processor acknowledges bus (and memory) access requests, and the bus is free, it activates a timing or I/O (input/output) cycle independent from its internal cycle, grants the bus access to the highest priority requesting controller and activates a memory cycle synchronized with the I/O cycle. During such cycle, the presence of other bus access requests is verified and at the end of the cycle, a new bus access is immediately granted. Lacking new access requests, the bus control is synchronized again with the central processor cycle. The connection between peripheral controllers and memory, or between the central processor and memory through the bus, is made by means of a tridirectional connection gate. The tridirectional gate directly connects the central processor internal channel and the memory without the interposition of interface registers or of elements such as receivers or drivers. In this way, the information transfer between central processor and memory is extremely fast.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
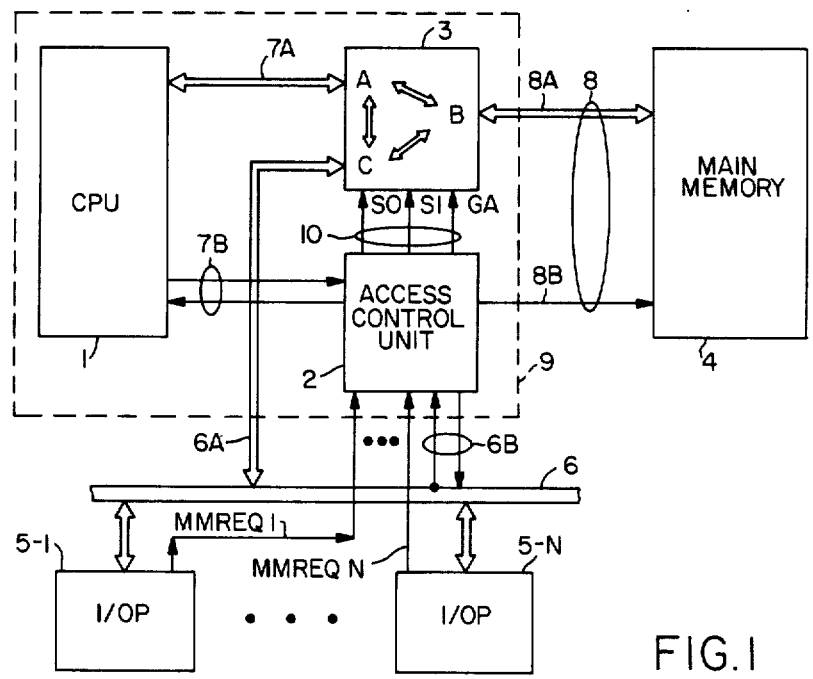
FIG. 1 shows in block diagram the architecture of a data processing system that is the object of the invention.

With reference to FIG. 1, the system architecture that is the object of the invention is shown in simplified block diagram form. The system of FIG. 1 comprises a central processor (CPU) 1, one access control unit 2, a set of tridirectional communication gates 3, a main memory (MM) 4 and a plurality of input/output processors (I/OP) 5-1, ..., 5-N, connected in parallel through common channel or bus 6. Bus 6 consists of a group of leads 6A (for example, 20 leads) for the bidirectional transfer of addresses/data/commands and of a group of leads 6B for the transfer of unidirectional control signals. The group of leads 6A is connected to a first input/output group C of tridirectional gates 3. The group of leads 6B is intended for the control of information exchange between the several communications with a second input/output group A of gates 3 through a channel 7A constituted by a group of 20 leads for the bidirectional transfer of addresses/data/commands. CPU 1 communicates with unit 2 through a group of leads 7B for the exchange of control signals. Memory 4 communicates with gates 3 and control unit 2 through a channel 8 consisting of a group of leads 8A, for the bidirectional transfer of addresses/data/commands between memory 4 and a third input/output group B of gates 3, and by a group of leads 8B for the exchange of control signals with control unit 2.

As explained in greater detail below, control unit 2 substantially consists of a priority network for resolving the conflict of several contemporaneous memory access requests by the several I/OP of a timing unit for bus 6 and the memory, and of a control logic for gates 3 to selectively establish a connection among the several input/output groups A, B and C. Unit 2 controls gates 3 through channel 10, through which selection signals GA, S0, S1 are sent to gates 3. Unit 2 and gates 3, while shown separated from CPU 1, may be part of the central processor and are preferably mounted on the same printed circuit board containing the CPU and marked with reference number 9. Therefore, the system physically consists of a circuit board 9, a memory 4, several I/OP 5-1 through 5-N. Bus 6 connects the several I/OP to circuit board 9.

Channel 8, which directly connects circuit board 9 to memory 4, can be very short. It has no intermediate taps and does not require drivers and interface receivers. Further, each I/OP is individually connected to access control unit 2 on circuit board 9 through leads MMREQ1 through MMREQN, respectively. Through such leads, each I/OP can send a bus 6 and a memory access request to unit 2.

Figure 2:
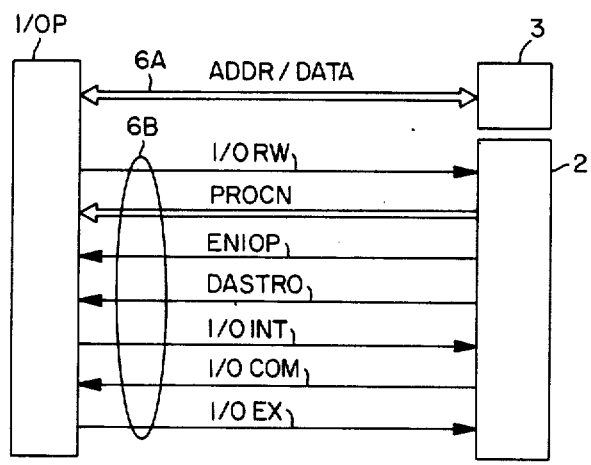
FIG. 2 shows the leads constituting a bus used in the system of FIG. 1.

FIG. 2 shows the leads constituting bus 6. Bus 6 comprises 20 leads ADDR/DATA for the bidirectional exchange of addresses and data (channel 6A). Channel 6B comprises:

- A lead I/ORW intended to transfer a combined signal I/ORW from the several I/OPs to unit 2, such lead determining, according to its logic level 0 or 1, if the memory access is required for a read or write operation, respectively;
- A set of leads PROCN, the number of which depends on the number of I/OPs, intended to transfer a combined coded information PROCN selecting an I/OP from unit 2 to the several I/OPs. If there are 8 or less I/OPs, 3 leads suffice;
- A lead ENIOP to enable unit 2 to signal to the several I/OPs that bus 6 and memory access has been granted to the I/OP specified by leads PROCN. The signal on lead ENIOP is used as "strobe" for the signals on leads PRCN. It has further timing functions;
- A lead DASTRO to enable unit 2 to signal to the several I/OPs that data is present on channel 6A. The signal on lead DASTRO is used as "strobe" for the signals on channel 6A;
- A lead I/O INT to enable the I/OPs to signal to unit 2 that an I/OP has stored a message in memory which must be read out by the CPU;
- A lead I/O COM to signal from unit 2 to the several I/OPs that the CPU is sending a command to an I/OP. The type of command and the I/OP involved are specified by channel 6A contents; and
- A lead I/O EX to signal from the involved I/OP to the CPU that command I/O COM has been received.

Figure 3:
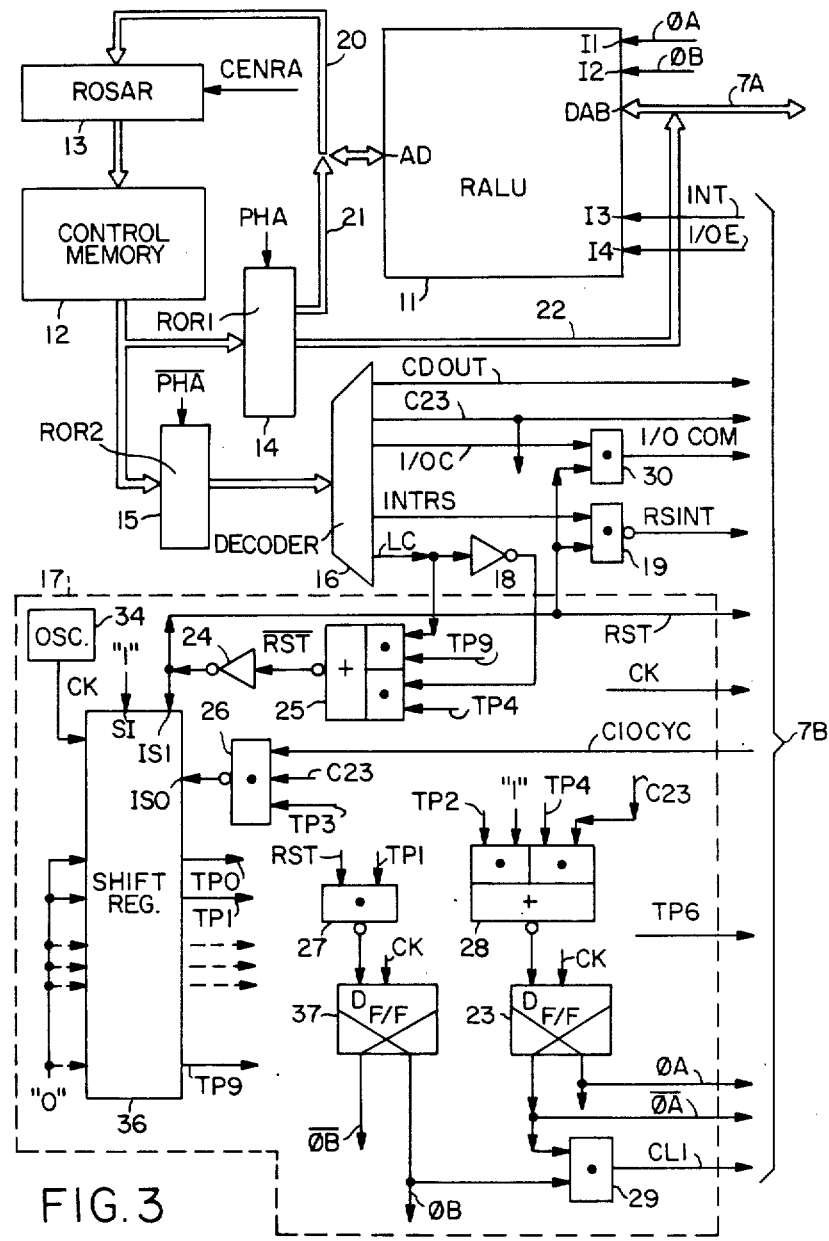
FIG. 3 shows a detailed block diagram of the central unit architecture of the system in FIG. 1.

FIG. 3 shows a block diagram of the CPU in the form required for understanding the invention. The construction details and the variants of a central processor are well known to those skilled in the art. Further, CPU integrated circuits are available on the market which are suitable to be used in the present invention with the addition of few external components. The architecture and the application of these CPU integrated circuits are widely disclosed by the technical manuals of the manufacturers, among which INTEL, MOSTEK, AMD, and SYNERTEK are mentioned.

CPU 1 substantially comprises a logical/arithmetic unit or RALU 11, a control memory 12 containing control microprograms, an addressing register of ROSAR 13 for control memory 12, two microinstruction registers 14 and 15, respectively, or ROR 1 and ROR 2, a microinstruction decoder 16 and a timing unit 17. Besides logical/arithmetic networks, unit RALU contains suitable working register banks. RALU 11 comprises two inputs I1 and I2, receiving two timing signals ØA and ØB, respectively, from the timing unit, a first set of gates DAB which may act, in different phases, as input or output gates and which are directly connected to channel 7A, a second set of gates AD which may act, in different phases, as input or output terminals, and two inputs I3 and I4 for receiving signals INT and I/OE, respectively.

The gates AD are connected to register ROSAR 13 inputs through channel 20 and to some outputs or register 14 (ROR 1) through channel 21. The gates DAB are connected, in addition to channel 7A, to some outputs of register 14 (ROR 1) througn channel 22. Register 13 outputs are connected to the addressing inputs of control memory 12 whose outputs are connected to the inputs of both register 14 (ROR 1) and register 15 (ROR 2). Register 15 outputs are connected to the inputs of decoder 16. Register 13 (ROSAR 1) is enabled to load an address by a timing signal CENRA received from timing unit 17. When CENRA is at logical 1, the address is loaded. When CENRA is at logical 0, the address contained in ROSAR is steadily present at the output. Register 14 (ROR 1) is enabled to load a microinstruction in the output from the control memory by a timing signal PHA. When PHA is at logical 1, the microinstruction is loaded while the outputs are kept in a high impedance status. When PHA is at logical 0, the microinstruction contained in ROR 1 is steadily present at the outputs. Likewise, register 15 (ROR 2) is enabled to load a microinstruction when a timing signal PHA-bar (PHA with a bar over it) is at logical 1 and this microinstruction is steadily present at the outputs when PHA-bar is at logical 0.

Unit RALU 11 operation takes place during several machine cycles, each one consisting of a first and a second phase during which ØA is at logical 1 and ØA is at logical 0, respectively. When ØA is at logical 1, each one of gate sets DAB and AD is enabled to receive in input a portion of the microinstruction contained in ROR 1. To this purpose PHA is at logical 0 within the interval during which ØA is at logical 1. The received microinstruction controls the operation executed by RALU 11 during the machine cycle. Among such operations, the establishing of the subsequent microinstruction address in the control memory is present. During the second phase, the address is available at gates DA and is loaded into ROSAR 13. To this purpose, CENRA is at logical 1 when ØA is at logical 0. During the second phase, gates DAB are always enabled, if necessary, to receive or load some information from or into channel 7A. This occurs if the pending microinstruction controls input/output operations, that is, read/write memory or the sending of control signals to an I/OP. These operations will be described below.

The microinstruction loaded into register 15 (ROR 2) is decoded by decoder 16 into a set of commands (microcommands) which control both the operations outside unit 1 and the operation of timing unit 17. Once loaded into register 15, these commands are present for the whole remaining duration of the machine cycle.

The meaningful commands for the invention understanding are:

CDOUT: This command means that during the machine cycle RALU 11 loads channel 7A with some information which must be transferred outside.

C23: This command indicates that during the machine cycle the CPU wants to start a read/write memory cycle.

I/O COM: This command indicates that the CPU wants to send commands to an I/OP.

INTRS: This command indicates that the CPU wants to reset the interrupt signal INT received by RALU.

LC: This command indicates that the pending machine cycle must be long for managing the execution of determined operations such as, for instance, the access to a local memory contained in RALU 11 or for matching its own cycle duration to the duration of memory 4 cycle in case of write/read memory.

Command LC is sent to timing unit 17 in direct form and in inverted form through NOT 18. Command INTRS is NANDed, (through NAND gate 19) with a signal RST coming from timing unit 17, and generates a signal RSINT falling to a logical 0 at the end of a machine cycle (if INTRS is at logical 1). Command I/OC is ANDed (through AND gate 30) with signal RST and generates a signal I/O COM timed as RST. Unit 17 generates as output some periodic timing signals, some of which, such as CENRA, PHA, PHA-bar and ØB are only used for CPU 1 timing. Other ones, such as ØA and RST are used for both CPU 1 and control unit 2 timing. Still other ones, such as ØA, CK, TP6 and CL1 (which will be discussed below), are used for unit 2 timing. Unit 17 receives as input a signal CIOCYC from unit 2. The several leads transferring signals INT, I/OE, CDOUT, C23, I/O COM, RSINT, CK, CIOCYC, ØA, ØA-bar and CL1 constitute channel 7B of FIG. 1. For the sake of clearness, such leads will be named in the following description with the same reference name as the signal they transfer.

Figure 4:
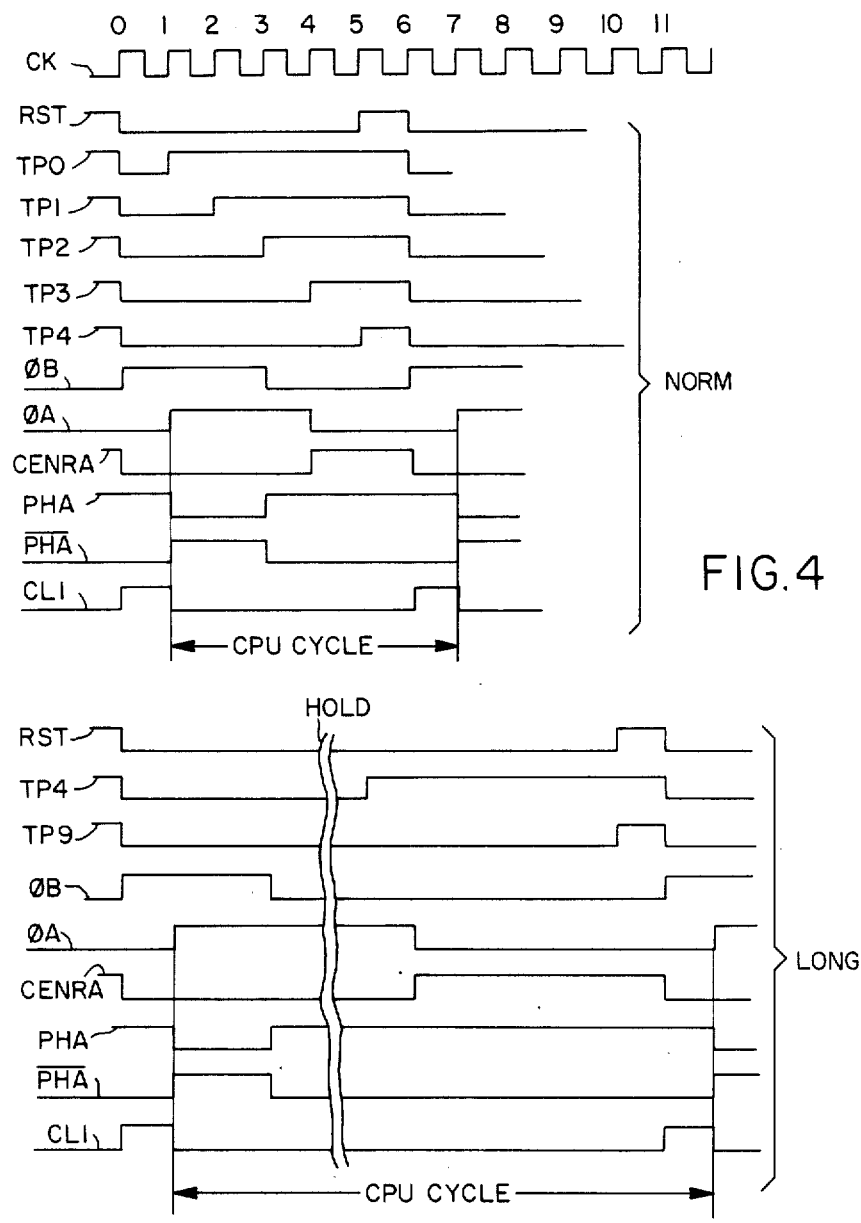
FIG. 4 shows a timing diagram of some signals generated by the central unit of FIG. 3 used for the timing and the control of the system in FIG. 1.

Timing unit 17 consists substantially of an oscillator 34, a shift register 36, two flip-flops 37 and 23, and suitable logic gates. Oscillator 34 generates a square wave clock signal CK with a pre-established period of 50 nsec. This signal is applied to the input of shift register 36 and of flip-flops 37 and 23. In addition, as already mentioned, it is transferred to unit 2. Shift register 36, with a capacity of 10 bits, comprises a serial input SI permanently connected to a logical 1, ten parallel loading inputs permanently connected to a logical 0 and two control inputs IS1 and IS0. When IS0 is a logical 1 and IS1 is a logical 0 at each rising edge of CK, register 36 shifts the logical level contained in each cell to the subsequent cell. When ISO is a logical 0 and IS1 is a logical 0, register 36 is locked in the current status, that is, the clock pulses do not modify its sttus. When IS0 is a logical 1 and IS1 is a logical 1 at each rising edge of CK, the register loads the several cells in parallel with the level present at the parallel loading inputs. Practically, it is reset. Timing signals TP0 through TP9 are available at outputs of register 36. The timing of these signals is shown in FIG. 4. Input IS1 receives signal RST obtained from a signal RST-bar through NOT 24. Signal RST-bar is obtained as output from AND-OR-NOT gate 25. Gate 25 receives at the inputs of a second AND section signals LC-bar and TP4. Input IS0 is connected to the output of NAND gate 26 receiving in input signals CIOCYC, C23 and TP3.

Briefly, register 36 operates as follows: From an initial reset status, where the register is discharged (TP9=0, TP4=0, TP3=0), the register begins to load, starting from its first cell, at each block pulse. After 4 clock pulses, TP3 rises to a logical 1. If, at this point, C23 and CIOCYC are at a logical 1 also, the register status is locked. Instead, if at least one of signals C23, CIOCYC is a logical 0, the register goes on loading. After 5 clock pulses TR4 rises to a logical 1. If LC-bar is a logical 1, signal RST rises to a logical 1. With the subsequent clock, that is, after 6 clock pulses, register 36 is reset. If LC-bar is a logical 0, register 36 goes on loading. After 10 clock pulses, TP9 rises to a logical 1 and because LC is a logical 0, signal RST is generated. With the subsequent clock, that is, after 11 clock pulses, register 3 is reset. In conclusion, register 36 cyclically develops and defines machine cycles of variable duration. If signal CIOCYC from unit 2 is a logical 0, these cycles have a duration of 300 nsec or 500 nsec, according to whether signal LC-bar or LC is a logical 1, respectively. When signal CIOCYC is a logical 1 in unit 2, together with signal C23, the pending cycles are suspended until CIOCYC again becomes a logical 0. Flip-flop 37 is a D-type flip-flop and receives signal CK at the clock input and the output from NAND 27 at its D input. Signals ØB and ØB-bar are available at the outputs of flip-flop 37. Likewise, signals ØA and ØA-bar are available as outputs from flip-flop 23 which is clocked by signal CK and receives at its D input the signal obtained from AND-OR-NOT gate 28. Signal CL1 is obtained as the logical product of ØA and ØB through AND gate 29. Signals CENRA, PHA and PHA-bar are obtained from signals ØA and ØB through logical circuits which are not shown in FIG. 3 for the sake of simplicity.

FIG. 4 shows a timing diagram of the signals. It is clear that CENRA is obtained by the logical operation ØA OR ØB, that PHA-bar is ØA and ØB and that PHA is NOT (ØA and ØB). In FIG. 4, the cases of the normal timing cycle and the long cycle are shown (NORM and LONG, respectively). In the case of the long cycle, it is evident that between the clock pulses number 4 and number 5, the cycle may be extended (HOLD) for a variable number of clock periods owing to the contemporaneous presence of signals CIOCYC and C23.

The mutual relation between timing and CPU cycles can be arbitrarily established. For instance, it may be stated that a machine cycle starts as soon as register 36 is reset (i.e., when CK becomes a logical 0). Conceptually, it would be better to consider the start of a cycle to be the instant ØA rises to a logical 1. In fact, as already mentioned, RALU 11 begins to receive the internal commands controlling its operation during the cycle beginning with such instant. Besides, independnetly from its length, the machine cycle is divided into two phases. During the first phase, when ØA is logical 1, RALU 11 receives the necessary commands and generates the subsequent microinstruction address. During the second phase, when ØA is a logical 0, RALU 11 emits the next microinstruction address on outputs AD and, if necessary, enables gates DAB to communicate with the outside. During the whole second phase (and a little before) the commands (microcommands) necessary to control the operation external to RALU 11 are also available.

Figure 7:
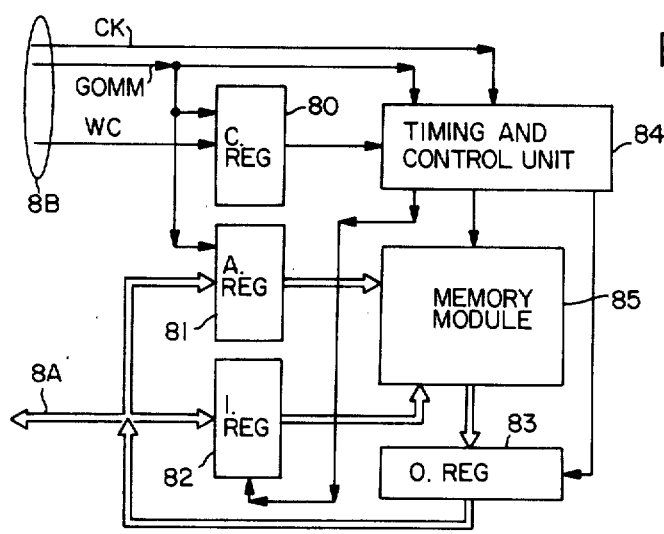
FIG. 7 shows a block diagram of the working memory of the system in FIG. 1.

The architecture of working memory MM4, shown in block diagram form in FIG. 7, is briefly described before considering in detail control unit 2. Memory 4 architecture is of a known and conventional type. Therefore, only a little description is required. A more detailed description can be found in U.S. Pat. No. 4,249,253. Memory 4 comprises a register 80 (CREG) for the latching of input commands, a register 81 (AREG) for the latching of an input address, a register 82 (IREG) for the latching of input data, a register 83 (OREG) for the latching of output data, a timing and control unit 84 and a memory cell matrix 85 or memory module. The inputs of registers 81 and 82 are directly connected to channel 8A (see FIG. 1). Register 80 receives as input some memory commands through channel 8B (see FIG. 1). FIG. 7 shows that register 80 receives as input, through lead WC, a command specifying the operation to be executed. If the command is a logical 1, the operation is a write operation. If it is a logical 0, the operation is a read out operation. Generally, memory 4 may receive further commands defining, for instance, if the full width of the memory is to be read or written (i.e., 2 bytes), or if only 1 byte is to be read/-written and if this byte is the right or the left byte. These features are outside the scope of the invention.

Control and timing unit 84 receives as inut, through channel 8B, the periodic timing signal CK and an activation command GOMM. The activation command GOMM causes the loading of registers 80 and 81 with the commands present on leads, such as WC, and with the address present on channel 8A respectively. When command GOMM is received, the timing and control unit is activated. It generates a timing cycle during which suitable commands are developed. Such commands control the addressing of memory module 85 with the address contained in register 81, and if the operation is a write, they control the loading of register 82 with the data to be written and the sending to module 85 of the data to be written. If the operation is a read-out, they control the loading of the read-out data into register 83 and its transfer to channel 8A.

The disclosed memory is of the kind where only one channel 8A is used to transfer addresses and data using a multiplexing technique. In fact, for module 85 operation, it is necessary that the addresses be available at the beginning of the memory cycle while the data to be written is necessary and the read-out data are available only at the end of the memory cycle. Typically, memory 4 can have a cycle of 800 nsec. and require that the data to be written by available in register 82 within 600 nsec after the beginning of the cycle, while the read out data is available at the register 83 outputs during the last 150 nsec of the cycle.

The read/write memory operation performed by CPU 1 will be described even though control unit 2 has not yet been described. As explained below, if no access memory requests from I/OP have been accepted, control unit 2 is transparent to the information exchange between CPU 1 and memory 4 and presets gates 3 status for the exchange between CPU 1 and memory 4. Therefore, during a first machine cycle of 550 nsec., CPU 1 can generate a memory activation command and put an address on outputs DAB. The address is available (FIG. 4) on channel 7A, 250 nsec. after the beginning of the cycle and is made available at register 81 inputs through gates 3 with the only propagation delay being due to such gates and to the length of the connection, as contrasted with the case where the connection is made through the bus and a register, drivers and receivers in cascade. Command C23 is available even before the address, but it is suitably delayed by control unit 2, as explained below, in order to be received by memory 4 about 300 nsec. after the beginning of the CPU cycle, that is, when the address is steadily present at the inputs of register 81. Thereafter, register 81 can be loaded and a memory cycle started.

At the end of the first machine cycle, CPU 1 starts a second machine cycle, also with a length of 550 nsec. During the second phase of which ⌀A is a logical 0, CPU 1 enables gates DAB to send data to be written into memory, or to receive the data to be read out from memory. Therefore, 250 nsec. after the beginning of the second CPU cycle, and approximately 550 nsec. after the beginning of the memory cycle, the data to be written is available on channel 8A, 600 nsec. after the beginning of the memory cycle.

In the case of reading, the read-out data is available on memory channel 8A, 650 nsec. after the beginning of the memory cycle, that is, approximately 400 nsec. after the beginning of the second CPU cycle, and is certainly available at gate DAB, 500 nsec. after the beginning of the second cycle and can be loaded into RALU 11, for instance, with the rising edge of signal ⌀B used as a strobe. With a third machine cycle, CPU 1 can control a new access memory operation, and so on.

A transfer rate between memory and CPU 1 equal to $10^9/1100$ memory operations per second is obtained, which is not hampered by any preliminary dialogue with unit 2 to get access to memory. It is to be noted that the 1100 nsec. period for the read-out memory is longer than then memory cycle of 800 nsec. and is limited by the structural limitations of CPU 1 using only one DAB gate to send addresses and to send/receive data, as well as by the logical limitation stating that a read/write memory operation is generally conditioned by the success of the previous one, and that the addresses are available in CPU 1 only during a second phase of the machine cycle. If a hypothetical CPU 1 is able to send to or receive from memory a datum, and contemporaneously send to memory an address for a subsequent read-out operation, and overlapping of CPU cycles dedicated to memory access operations can be obtained and the transfer speed is only affected by the memory cycle length. Practically, such CPU 1 architecture is not used because it is preferable to be sure of the success of each read/write memory operation before starting a subsequent read/write operation. In fact, it is known, even if the consideration is beyond the scope of the invention, that information received by memory for writing, and information read out from memory can be affected by an error detected through the associated parity bits.

In the first case, the memory generates an error signal at the end of the cycle. In the second case, the CPU 1 itself detects the error. In both the cases, the result of the error control is available to CPU 1 only at the end of the memory cycle. Therefore, other memory operations are not admitted before a previous memory operation is concluded.

Figure 5:
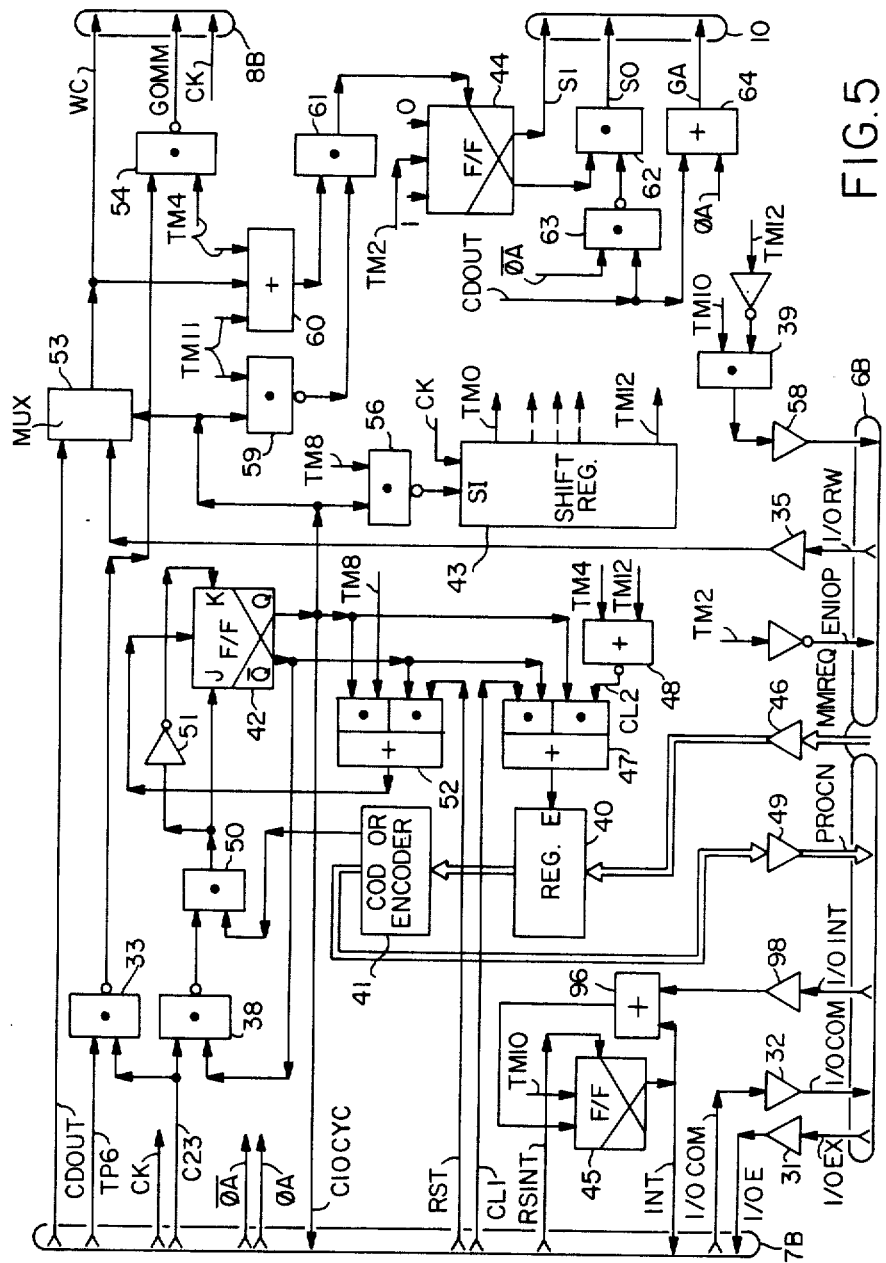
FIG. 5 shows a detailed block diagram of the architecture of the control unit of the system of FIG. 1 that controls the access to a common memory by the central unit and by the input/output processors connected through the bus of FIG. 2.

FIG. 5 shows control unit 2 in detail. The function of unit 2 is to handle the several I/OP access requests to bus 6 and memory 4 and to handle in a transparent manner memory 4 access by CPU 1 when access requests from I/OP are not present. Essentially, unit 2 comprises a priority network, a timing unit and a control logic for gates 3. The priority network consists of a register 40, a priority encoder 41, a control flip-flop 42 and logical gates, which will be described below. The control logic of gates 3 consists of a flip-flop 44 and logical gates, which will be described below. The timing unit consists of a shift register 43 and a NAND gate 56. The timing unit can have an active status and an inactive status. When active, it generates a train of timing signals TM0 through TM12 (as timing unit 17) defining an I/OP (input/output) cycle. When inactive, signals TM0 through TM12 are permanently at a logical 1.

Considering now the priority network, register 40 inputs are connected to leads MMREQ through receivers 46. The access memory requests present on leads MMREQ are latched in register 40 when a logical 1 signal is received at control input E. Control input E is connected to the output of AND-OR gate 47 having two AND input sections. Two inputs of a first section are respectively connected to lead CL1 and to the output Q-bar of flip-flop 42. Two inputs of a second section are respectively connected to output Q of flip-flop 42 and to the output of a NOR gate 48. NOR gate 48 receives as input two timing signals, TM4 and TM12. The outputs of register 40 are connected to the input of priority encoder 41. The priority encoder assigns a pre-established priority to the signals present at each input and emits, on its COD outputs, a code representative of the highest priority signal present at the input. COD outputs of encoder 41 are connected, through a driver set 49, to leads PROCN. Further, an output OR of the encoder emits a signal at logical level each time an access request is present as an input. Output OR is connected to an input of AND gate 50. A second input of AND gate 50 is connected to the output of a NAND gate 38 having inputs connected to lead C23 and to output Q-bar of flip-flop 42. The output of NAND gate 50 is connected to input J of flip-flop 42 and, through a NOT 51, to input K. The clock input of flip-flop 42 is connected to the output of AND-OR gate 52 having two AND sections. A first AND section has an input connected to the output Q of flip-flop 42 and receives the timing signal TM8 at a second input. The second AND section has an input connected to the Q-bar output of flip-flop 42 and receives the timing signal RST at a second input. A communications path between CPU 1 and memory 4, or between channel 6B and memory, is established by multiplexer 53. Multiplexer 53 receives signal CDOUT coming from CPU 1, at a first input and signal I/ORW coming from bus 6 at a second input through receiver 35. The output of multiplexer 53 is connected to a lead WC transferring to memory 4 a read/write command depending on its logical level 0 or 1, respectively. Memory 4 activation is caused by a command at logical level 1 on lead GOMM. Lead GOMM is connected to the output of a NAND gate 54 receiving on a first input a timing signal TM4. The second input of NAND gate 54 is connected to the output of a NAND gate 33 receiving as input signal TP6 and command C23, both coming from CPU 1. Memory 4 further receives from CPU 1 the timing signal CK through a combined lead. Leads WC, CK and GOMM constitute channel 8B of FIG. 1.

The operation of the priority network is now described without detailing the timing section of unit 2, which will be described below. The status of flip-flop 42 essentially indicates whether an I/O cycle, that is, a memory and bus 6 occupation by one of the I/OPs, is occurring. When flip-flop 42 is set, it generates a signal CIOCYC at logical 1 at its direct output Q and when it it is reset, generates a signal CIOCYC-bar at logical 1 at its inverted output Q-bar. If flip-flop 42 is reset, no I/O cycles are occurring, the timing section is inactive, TM4 is kept at logical level 1 and CPU 1 receives a signal CIOCYC at logical level 0. Hence, CPU 1 normally performs its machine cycles, normal or long, according to its own needs. Particularly, if CPU 1 wants to access the memory, it generates command C23 which, suitably timed by signal TP6, is transferred through NAND 33 and NAND 54 and generates command GOMM. No preliminary dialogue takes place between CPU 1 and control unit 2 and the CPU can access memory 4 without delay. The kind of memory operations (read or write) are established by command CDOUT, which is transferred to memory 4 through multiplexer 53 generating signal WC. CPU 1, during its operation, periodically emits at each machine cycle, signals CL1 and RST. With reference to FIG. 4, CL1 is emitted at the end of a CPU 1 cycle and RST immediately before CL1. When flip-flop 42 is reset, signal CL1, emitted at the end of a cycle N of the CPU, enables the loading of register 40 and possible access requests present on leads MMREQ are loaded into register 40 and are made available at the inputs of decoder 41. After a certain time, however, shorter than 200 nsec., encoder 41 makes the signals corresponding to the access request status available at outputs COD and OR. If at least one access request is present, output OR rises to 1. At the end of the subsequent cycle N+1 of CPU 1, immediately before CL1, RST applies a clock pulse to flip-flop 42 through AND-OR gate 52. In case cycle N+1 of CPU 1 does not require a memoryoperation for CPU 1, and therefore C23 is at logical 0, flip-flop 42 is set or kept in reset, depending on whether output OR of encoder 41 is at logical level 1 or 0. If C23 is at logical 1, the setting of flip-flop 42 is inhibited. In fact, an I/OP memory access request considered at the end of cycle N+1 of CPU 1 cannot prevail over a CPU 1 operation already occurring which requires a read/write memory operation. In this case, CPU 1 addresses memory 4 through gates DAB and 3 with cycle N+1, and with the subsequent cycle N+2 completes the memory operation loading channel 7A with the information to be written into memory, or receiving from channel 7A the information read out from memory. Only at the end of cycle N+2, signal RST1 causes the setting of flip-flop 42, that is, the pending request MMREQ is considered.

In conclusion, if no I/OP access of memory is occurring, the MMREQ status is periodically verified by unit 2 in synchronization with the operations of CPU 1 which can access the memory without delay each time it wants, provided no I/OP requests are present.

Memory 4 access by CPU 1 takes place during two CPU cycles, an addressing cycle and a read/write cycle. When unit 2 detects a MMREQ access request, and when the possible occurring memory operation of CPU 1 is completed, flip-flop 42 is set and the timing control of the access memory operations through bus 6 is performed by the timing section of unit 2. In fact, when flip-flop 42 is set, signal CIOCYC sent to CPU 1 is at logical level 1. Therefore, CPU 1 can continue, in an asynchronous manner, with its machine cycle but, if during a machine cycle a memory operation is required, the memory access is inhibited and the corresponding machine cycle is stopped until CIOCYC falls again to logical level 0. Further, when flip-flop 42 is set, the input sections AND of AND-OR gates 52 and 47 receiving the timing signals generated by the timing section of unit 2, are enabled. Instead, the input section AND receiving signals RST1 and CL1 from CPU 1 are inhibited because CIOCYC-bar is at logical 0.

The timing unit of unit 2 comprising shift register 43 and NAND 56 will now be described. Serial input SI of shift register 43 is connected to the output of NAND gate 56 and receives on its clock input the signal CK. A first input of NAND gate 56 receives signal CIOCYC present at the output Q of flip-flop 42 and the second input receives signal TM8 present at an output of register 43. When flip-flop 42 is reset, a logical level 1 is present at input SI of register 43 and the register is loaded, that is, its output TM0 through TM12 are at logical level 1. When flip-flop 42 is reset, input SI of register 43 falls to a logical 0 and register 43 progressively discharges at each pulse CK, that is, outputs TM0 through TM12 fall in sequence to logical level 0. When output TM8 falls to logical level 0, input SI of register 43 rises to logical level 1 and the register charges again with the subsequent pulses CK. When TM8 rises again to logical level 1, flip-flop 42 receives a clock pulse and it is kept in the set state, or changes to the reset state, according to the status of its inputs J and K. If flip-flop 42 is kept in set, register 43 starts again to discharge, otherwise it completes its charging and maintains its charged status until flip-flop 42 is set again.

Figure 6:
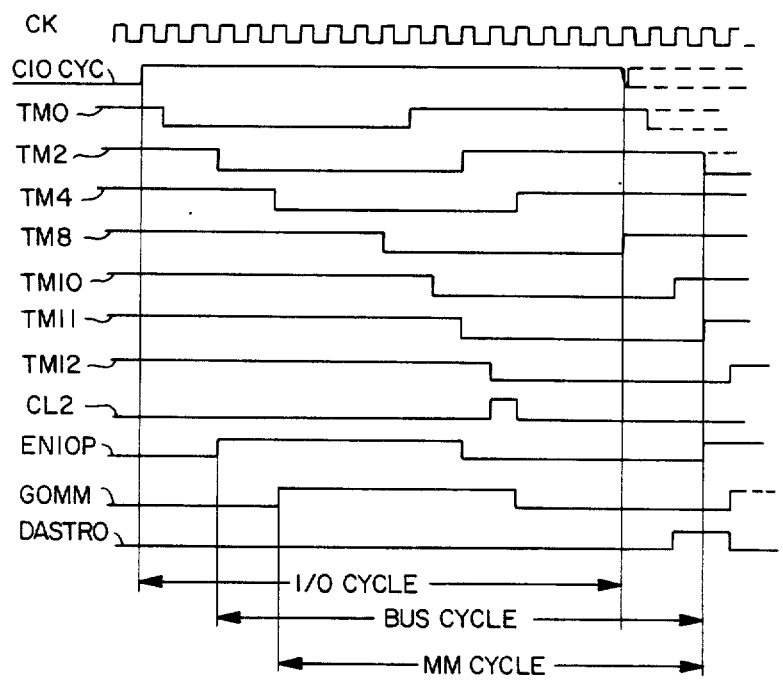
FIG. 6 shows a timing diagram of some timing and control signals generated by the access control unit of FIG. 5.

FIG. 6 shows a timing diagram of the signals present on some of outputs TM0 through TM12, as well as some derived signals. Evolution of register 43 defines subsequent I/O (input/output) timing cycles of a duration of 900 nsec. Within these cycles, the signals present on outputs TM0 through TM12 are used to generate suitable interface signals.

FIGS. 5 and 6, jointly considered, show that signal TM2, through driver inverter 57, generates signal ENIOP on bus 6. The reception of ENIOP by the I/OP effectively starts a bus cycle, that is, the I/OP which has received the bus access can actually load channel 6 with some information.

It should be noted that signal ENIOP is generated with a delay of about 150 nsec. relative to the beginning of the I/O cycle. Such delay is essential to allow the completion of previous memory operations. In fact, as mentioned, an I/O cycle starts when flip-flop 42 is set and this occurs 100 nsec. before the end of the possible previous memory cycle activated by the CPU. Further, as will be described below, a memory cycle activated by control unit 2 terminates 150 nsec. after the beginning of a possible new I/O cycle. The "bus cycle" is also 900 nsec. long, but it is 150 nsec. delayed with respect to the I/O cycle. Signal TM4 supplies the memory activation signal GOMM through NAND 54. The generation of GOMM starts a memory cycle. Signal GOMM is always generated after ENIOP (in this case, the delay is 100 nsec.) to enable the several I/OPs to receive signal ENIOP and to allow the I/OP, which has received the bus access, to load the bus with the necessary memory address information. Signals TM10 and TM12 generate, through NOT 65, gate 39 and driver 58, bus signal DASTRO. Signals TM4 and TM12 generate, through NOR 48, a register 40 loading signal CL2. During an I/O cycle, signal CL2 performs the functional equivalent of signal CL1 (generated by the CPU) to acknowledge the I/OP bus access requests. At the end of an I/O cycle, signal TM8 performs the same function as CK1 (generated by CPU), that is, it activates flip-flop 42 in case a new I/O cycle is to be started. The preliminary dialogue occurring between the several I/OPs to obtain the bus access therefore overlaps a possible previous memory cycle. In the case of information transferred between I/OP and memory 4, the transfer rate is $10^9/900$ memory operations per second. The control logic operation of gates 3 is now described along with its timing relationship with respect to memory operations.

With reference to FIG. 5, the control logic of gates 3 substantially consists of flip-flop 44 and logical gates 59, 60, 61, 62, 63 and 64. Flip-flop 44 has its inputs J and K permanently at logical level 1 and 0, respectively, and it is normally reset. It is activated by a falling edge applied at its clock input, which is connected to output TM2 of register 43. Though flip-flop 44 is set only during an I/O cycle and 150 nsec. after the beginning of an I/O cycle when TM2 falls to logical level 0, flip-flop 44 is reset (or kept reset) by a signal at logical level 0 applied to the reset input. The reset input is connected to the output of AND gate 61. An input of AND gate 61 is connected to the output of OR gate 60, which receives as input signals TM11, TM14 and command WC. A second input of AND gate 61 is connected to the output of NAND gate 59 receiving as input signals CIOCYC-bar and TM11.

By referencing the reset logic consisting of gates 59, 60 and 61, it can be seen that flip-flop 44 receives a reset command at two well identified instants:

In the case of a read I/O cycle (command WC is at logical 0) before the end of the cycle, with the falling of TM11 to logical level 0, when TM4 is already at logical level 0, that it, 350 nsec. After the beginnig of the memory cycle; and In the case of a write I/O cycle (command WC is at logical 1), if a new cycle of I/O has not started and therefore CIOCYC-bar is at a logical 1, with the rising of TM11, 50 nsec. before the end of the memory cycle.

Referencing again FIG. 5, the signal present at the output of flip-flop 44 establishes the status of signals S1 and S0 of channel 10. Direct output Q of flip-flop 44 supplies signal S1. Inverted output Q-bar supplies an input signal to AND gate 62 supplying an output signal S0. A second input of AND gate 62 is connected to the output of NAND gate 63. This receives an input signal ØA-bar and command CDOUT. OR gate 64, receiving as input signal ØA and command CDOUT, supplies as output on channel 10 selection signal GA. The status of gates 3, according to the logical level of the control signals S1, S0 and GA, is established by the following Table:

| S1 | S0 | GA | STATUS |
| --- | --- | --- | --- |
| 0 | 0 | X | A to B, A to C |
| 0 | 1 | 0 | B to A, B to C |
| 1 | 0 | 0 | C to B, C to A |
| 1 | 0 | 1 | C to B |
| 0 | 1 | 1 | B to C |

Character "X" in the Table indicates a "don't care" condition.

The Table shows that particular combinations of control levels enable gates 3 to transfer information from an input gate to both the other gates. It is now possible to consider the control logic operation in the different possible cases which may be divided into two groups:

FIRST GROUP

CPU 1 MEMORY ACCESS OPERATIONS OR CPU INTERNAL OPERATIONS

Since no I/O operation is occurring, flip-flop 44 is reset and S1 is at a logical 0. Further, during the first phase of the machine cycles when ØA is at logical 1 and ØA-bar is at logical 0, it is certain that S0 is at logical 1 and GA is at logical 1. Gates 3 connect B to C, which is not used, while gate A, corresponding to channel 7A, is isolated. It is therefore assured tht no information is received on channel 7A from outside CPU 1 when, during the first phase of the cycle, channel 7A is used to transfer register 14 (ROR1) microcommands to inputs DAB or RALU 11 (see FIG. 3).

For the second phase of the machine cycle when ØA is at logical 0 and ØA-bar is at logical 1, the following cases are possible:

1st Case: Memory 4 addressing or writing.

Since CDOUT is at logical 1 and ØA is at logical 1, it results that S0 is at logical 0 and GA is at logical 1. Gates 3 connect A to B and A to C with a delay as to the commutation of ØA and ØA-bar, depending on the propagation times of the logical chain NAND 63, AND 62 and gates 3. The propagation time can be restrained within 50 nsec. Therefore, even in the most critical case of memory addressing, when signal GOMM is generated, gates 3 are already enabled and the connections already established. Connection A to B is always used, while connection A to C is used in particular conditions (I/O command), which will be described later on.

2nd Case: Memory 4 reading, or CPU 1 internal operations.

Since CDOUT is at logical 0, it results that S0 is at logical 1 and GA is at logical 0. Gates 3 connect B to A and B to C with the above described delay. No critical timing constraints are present because the information is loaded into RALU 11 at the end of the machine cycle only. Connection B to A is actually used. Connection B to C is not used. In the case of an internal cycle, no interferences are present between internal data and external data on channel 7A.

SECOND GROUP

I/OP MEMORY ACCESS OPERATIONS

Such operations occur through the activation of an I/O cycle and consist of a first phase of memory 4 addressing and by a second phase of writing or reading. The timing unit (register 43) is activated for all the operations of this group. Therefore, with the falling of TM2, flip-flop 44 is set and remains set during the whole first phase. Therefore, S1 is at logical 1 and S0 is at logical 0. CDOUT can be either at logical level 1 (a write operation) and at logical level 0. GA can be at either logical level 1 or at logical level 0. Either way, connection C to B is assured, which is commanded at the beginning of the bus cycle, and is certainly effective at the beginning of the memory cycle. Further, if GA is at logical 0, connection C to A is actuated. However, any interference is avoided between the data present on channel 7A and the information used to CPU 1 cycles performed at the same time because during the first phase of the CPU 1 cycles when ØA is at logical 1, it is certain that GA is at logical 1 and possible external operations (memory addressing) are suspended before the second phase is started.

For the second phase of I/O cycles, the following cases are possible:

1st Case: A Write Operation.

The already actuated connection C to B must be kept until the end of the cycle. In fact, I/ORW is at logical 1 and therefore WC is at logical 1. Signal WC at logical 1 inhibits the possible reset action caused by TM11 falling to a logical level 0 through OR gate 60. The reset action is performed through NAND gate 59 by the rising of TM11 to a logical level 1 when the I/O cycle is completed and provided no new I/O cycle has started.

2nd Case: A Read Operation.

During the second phase of the cycle, B to C must be established. In fact, in this case I/ORW is at logical 0 and therefore WC is at logical 0. With the falling of TM11 to logical level 0, that is, 350 nsec. after the beginning of the memory cycle, when TM4 is already at logical level 0, the output of OR gate 60 falls to logical level 0 and flip-flop 44 is reset. Therefore, S1 is at logical 0 and since it is certain that CDOUT is at logical 0, it also results that S0 is at logical 1. Anyway, connection B to C is assured and if GA is at logical 0, connection B to A is assured, also. However, any interference with the information used in the CPU 1 cycles performed at the same time is avoided for the same reasons mentioned in the previous case. As can be verified, connection B to C is maintained until the end of the bus cycle.

Figure 8:
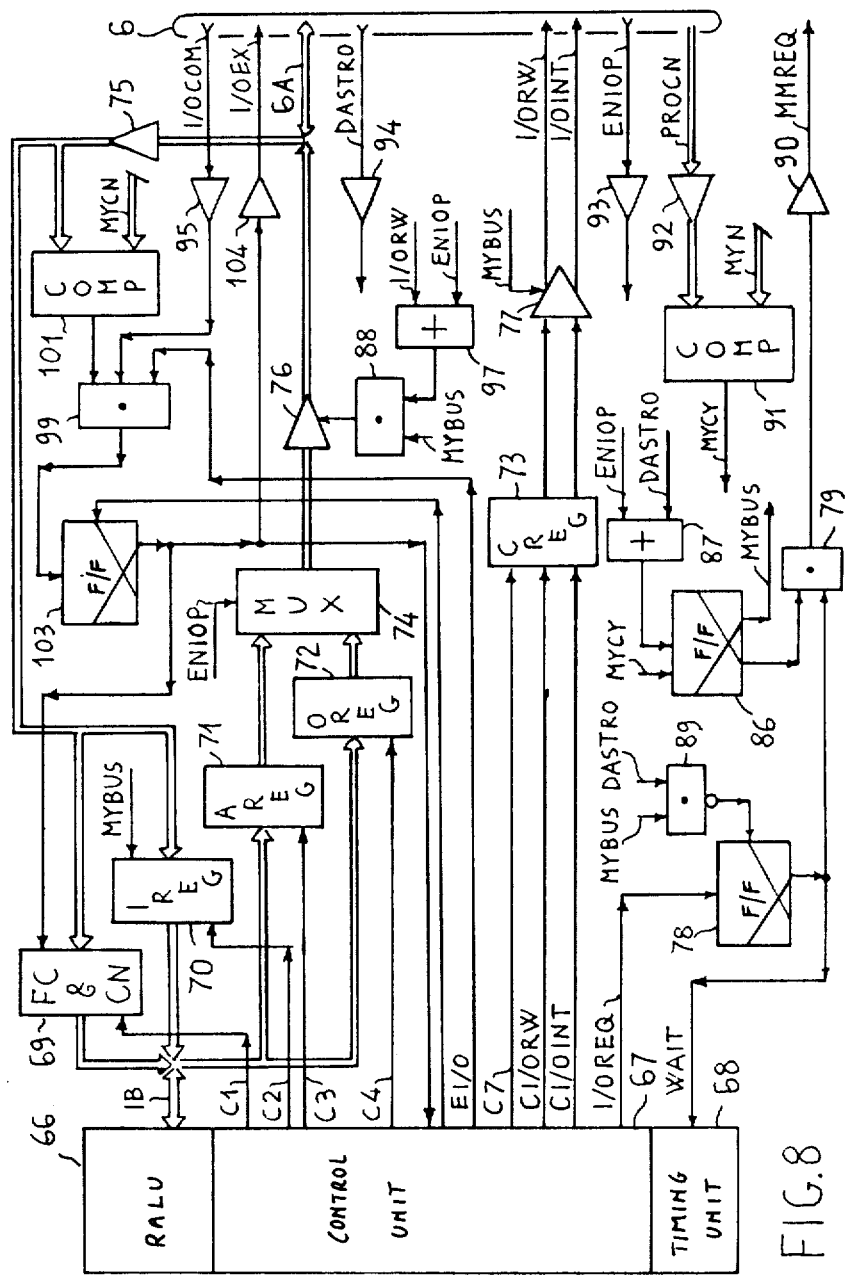
FIG. 8 shows a detailed block diagram of the input/output processor of the system in FIG. 1.

FIG. 8 shows, in block diagram form, the architecture of a peripheral controller, or I/OP, which is conventional except for some features which will be described. The controller comprises a logical/arithmetic unit (containing working registers) RALU 66, a microprogrammed control unit 67 and a timing unit 68. Such units are completely conventional and any further description is omitted. Unit RALU 66 communicates, through an internal bus IB, with the outputs of some input registers 69 and 70, and with the inputs of some output registers 71, 72 and 73. Besides generating some control commands for RALU 66, control unit 67 generates some external commands C1 through C7, CI-/ORW, CI/OINT and I/OREQ. Timing unit 68 supplies units 66 and 67 with suitable timing signals. Its working can be interrupted by a signal WAIT received from the outside. Commands C1 and C2 enable the outputs (normally having high impedance) of registers 69 and 70, respectively. Commands C3, C4 and C7 enable the loading of registers 71, 72 and 73, respectively. The inputs of registers 69 and 70 are connected to channel 6A of bus 6 through interface receivers 75. The outputs of registers 71 and 72 are connected to the input of multiplexer 74. The outputs of multiplexer 74 are connected to channel 6A through triface interface drivers 76. These are enabled by a signal at logical level 1 output from AND gate 88. Register 73 receives as input the commands C/IORW and CI/OINT, latches them with command C7, and transers them to leads I/ORW and I/OINT of bus 6 through tristate interface drivers 77. Drivers 77 are enabled by a signal MYBUS. Command I/OREQ, specifying that the I/OP wants to perform an input/output operation through bus 6, is applied to the set input of flip-flop 78 and sets it. The direct output of flip-flop 78 is connected to interface lead MMREQ through an AND gate 79 and an interface driver 90. When flip-flop 78 is set and gate 79 is enabled, a memory access request is generated on lead MMREQ. A comparator 91 has inputs connected to leads PROCN of bus 6 through interface receivers 92. A code MYN, identifying the specific I/OP, is permanently applied to a second group of inputs. When the code present on leads PROCN is equal to MYN, comparator 91 generates a signal MYCY as output. Through interface receivers 93, 94 and 95, the I/OP receives signals ENIOP, DASTRO and I/COM, which are transmitted by the combined leads of bus 6. Signal MYCY is applied to the input J of a flip-flop 86. Output Q-bar of flip-flop 86 is connected to the enabling input of gate 79. When flip-flop 86 is set, a signal MYBUS is generated at its output Q. Flip-flop 86 receives interface signals ENIOP and DASTRO at the clock input through OR gate 87. The reset input of flip-flop 78 is connected to the output of a NAND gate 89 receiving as input signals MYBUS and DASTRO. To access a memory, the I/OP loads register 71 with a memory address and, it the operation is a write operation, it loads register 72 with data to be written. Further, it generates suitable commands.

Command CI/ORW at logical level 1 loaded into register 73 means that the operation is a write operation. With command I/OREQ, the I/OP sets flip-flop 78 and generates signal MMREQ on the combined lead. When flip-flop 78 is set, a waiting signal WAIT is further sent to the timing unit and the I/OP waits for the acceptance of its request.

When control unit 2 (see FIG. 5) grants the bus access to the I/OP, it generates on lead PROCN a code equal to the I/OP code MYN and comparator 91 generates signal MYCY. Subsequently, unit 2 sends command ENIOP. At ENIOP reception, flip-flop 86 is set and generates signal MYBUS. Multiplexer 74 is controlled by signal ENIOP and transfers to its outputs the content of register 71 when ENIOP is at logical 1. AND gate 88 receives as input signal MYBUS and, through OR gate 97, signal ENIOP. When flip-flop 86 is set, tristates 76 are enabled and the memory address contained in register 71 is transferred to channel 6A. Tristates 77 are also enabled and signal I/ORW is transferred on the combined lead of bus 6. If a write operation is required, when ENIOP falls to logical level 0, tristates 76 are still enabled owing to signal I/ORW applied to an input of OR 97. Multiplexer 74 then transfers to channel 6A the data to be written in memory that is contained in register 72. If a read operation is required, tristates 76 are inhibited when signal ENIOP falls to logical level 0. At the end of the operation (bus cycle), signal DASTRO causes the resetting of flip-flop 78 through NAND gate 89 and the resetting of flip-flop 86 through OR gate 87. Further, the falling of signal MYBUS controls the loading of the information present on channel 6A into register 70 completing a possible requested read operation.

I/OP processors, as shown in FIG. 8, are able to communicate with CPU 1 through memory 4. They can load, through memory write operations, messages intended for CPU 1 into a memory zone named MAILBOX. Concurrently with the last memory write operation, the I/OP generates signal CI/OINT, which is transferred as an interrupt signal on leads I/OINT.

Referencing unit 2 (see FIG. 4), it can be seen that the signal on lead I/OINT is transferred through interface receiver 98 and OR gate 96 to the J input of flip-flop 45. Flip-flop 45 is set by the rising edge of signal TM10. Output Q of flip-flop 45 thereafter sends signal INT to CPU 1 through channel 7B. This signal is responded to by CPU 1 during particular phases of its process. To avoid the falling of signal INT before being responded to by CPU 1, output Q of flip-flop 45 is connected to a second input of OR gate 96. When CPU 1 responds to the interrupt, that is, reads out the message from the MAILBOX with at least a memory read cycle during which it generates signal RSINT, which resets flip-flop 45.

The communication process through MAILBOX is known in the art and is beyond the scope of the invention. Therefore, a further description is not required. The same communication mechanism through MAILBOX is used by CPU 1 to send messages to an I/OP. However, the particular system architecture object of the invention supplies some advantages. When CPU 1 wants to send a message (generally some instructions or commands) to a particular I/OP, it loads the message into the MAILBOX with memory read operations. A component of the message is a function code FC and a channel number CN identifying the I/OP to which the message is addressed. When CPU 1 loads channel 7A with code FC and channel number CN for writing in memory 4, it also generates command I/OC and signal I/OCOM (see FIG. 3). Such signal is transferred from unit 2 (see FIG. 5) through driver 32 to the combined lead of channel 6B and it is received by the I/OP connected to bus 6. It is to be noted that, thanks to the control logic of gates 3, code FC and channel number CN are transferred on body memory channel 8A and on channel 6A. Each I/OP (see FIG. 8) consists of a comparator 101 having a set of inputs connected, through receivers 75, to channel 6A, and a second set of inputs to which a code MYCN, or specific channel number for each I/OP, is permanently applied. When comparator 101 of an I/OP receives as input coincident codes, it generates an output signal at logical level 1. The output of comparator 101 is connected to the input of an AND gate 99 receiving a second input I/OCOM, through receiver 95, and on a third input an enabling singal EI/O coming from control unit 67. The output of AND gate 99 is connected to the clock input of a flip-flop 103, which is set when I/OP detects that the message is intended for it and is enabled to receive such message. Direct output Q of flip-flop 103, when set, provides control unit 67 with a control signal received by CPU 1, loads channel 6 through a driver 104 with signal I/OEX (which is received by the CPU through receiver 31 of FIG. 5), and further enables the register 69 to load the information (FC and CN) present on channel 6A. In this way, if the I/OP is provided with register 69, it can verify the right destination (CN) of the I/O command and consider an essential component of the message (function code FC) without requiring a memory access which could be refused for a certain time owing to the possible presence of higher priority memory access requests. In addition, the disclosed architecture allows the use of an I/OP having or not having a buffer register for I/O commands because the I/O command is recorded in memory.

In conclusion, the present architecture offers the following advantages. It reduces to the minimum the communication time between CPU 1 and memory 4 because no preliminary dialogue for access to the bus is required when CPU 1 wants access to the memory, although CPU 1 priority is lower than I/OP priority. This is because the control of the memory access requests is normally synchronized with the machine cycle of CPU 1 and because the communications between CPU 1 and memory 4 is established by the connection between the memory gate and the CPU internal channel with the interposition only of tridirectional gates 3. The synchronization between CPU 1 and memory 4 allows the elimination of any CPU 1 buffer register between the internal channel and the memory channel. Tridirectional gates 3 carry out the double function of drivers and receivers for both CPU 1 and memory 4, with a reduction in the number of components of in the propagation time. The architecture does not increase the communication time between I/OP and memory 4 because the I/O preliminary dialogue for memory access, when the memory is activated by an I/OP, overlaps the memroy cycle and is synchronized with the memory cycle. Wiating delay is not introduced for the preliminary dialogue or for the synchronization with the CPU when several I/OPs want access to the bus. The connection and the transfer of information from CPU 1 to the bus can be simultaneously made to memory 4 and to an I/OP.

The disclosed architecture can be implemented with the components available on the market and currently used in the implementation of electronic data processing systems, excepted for the tridirectional gates recently put on the market by Texas Instruments and having part number 74LS5442.

While the invention has been shown and described with reference to the preferred embodiment thereof, it will be understood by those skilled in the art that changes in form and detail may be made therein without departing from the spirit and scope of the invention.

What is claimed is:

1. A data processing system architecture where a central processor unit (CPU) and a plurality of input/output processors (I/OP) communicate with a common memory and operate in an asynchronous manner and independent the one from the other on the basis of internal cycles, and a memory access control unit in said CPU receives memory access requests from said CPU and said I/OP and grants access to only one I/OP at a time or to said CPU resolving access conflicts on the basis of pre-established priority assigned to said access requests, said data processing system architecture comprising:

(a) a system bus for the parallel connection of said I/OP;
   (b) said memory access control unit in said CPU comprising a set of gates for the selective connection of an input/output internal channel of said CPU with an input/output channel of said memory and the selective connection of said system bus with said input/output channel of said memory;
   (c) control means in said memory access control unit for periodically monitoring in synchronism with the CPU internal cycles, the presence of access requests from said I/OP, for controlling, when I/OP access requests are not present, said set of gates to connect said input/output internal channel of said CPU to said input/output channel of said memory and for transferring a possible memory activation command generated by said CPU to said memory; and
   (d) timing means in said memory access control unit and connected to said control means, non-responsive to memory access requests generated by said CPU, activated only by the detection of said I/OP access requests, for generating a timing cycle of said memory access control unit, said memory access control unit during said timing cycle providing for the generation of signal allowing bus access to the highest priority I/OP among the ones concurrently requesting access, for the control of said set of gates to connect, said bus with said input/output channel of said memory, for the generation of a memory activation command, for the acknowledging in a time interval within said timing cycle, the presence of further I/OP access requests, for inhibiting before said time interval, said control means from said periodical monitoring, for enabling said memory access control unit, after said time interval, if further I/OP access requests are detected in said time interval, for the generation of signal allowing bus access to the highest priority I/OP requsting access which has not received the bus access signal, and for enabling said control means to said periodical monitoring, after said time interval, if no further I/OP access request is detected in said time interval.

2. System architecture as per claim 1 wherein said set of gates comprises a set of tridirectional transmitting/receiving gates.

3. System architecture as per claim 2, wherein said set of gates selectively connects, on command from said memory access control unit, said internal channel of said CPU to both said input/output channel of said memory and to said bus.

4. System architecture as per claim 3 wherein said CPU further comprises means for generating an input/output command and wherein each I/OP comprises means able to receive said I/OP command, a comparator having an input connected to said bus to compare a binary code, generated by said CPU and transferred through said set of gates on both said input/output channel of said memory and on said bus with an internal recognition code, and wherein at least one of said I/OP comprises an interface register having an input connected to said bus, for the loading in said interface register, upon the reception of said input/output command by said I/OP and when said binary code coincides with said internal recognition code, said binary code together with other information generated by said CPU and transferred through said set of gates on both said input/output channel of said memory and said bus.

* * * * *